US009261880B2

(12) United States Patent
Seo et al.

(10) Patent No.: US 9,261,880 B2
(45) Date of Patent: Feb. 16, 2016

(54) APPARATUS AND METHOD FOR CONTROLLING VESSEL DEVIATING FROM ANCHORAGE (71) Applicant: ELECTRONICS AND TELECOMMUNICATIONS RESEARCH INSTITUTE, Daejeon (KR)

(72) Inventors: Dae-Hee Seo, Daejeon (KR); Byung-Doo Kim, Daejeon (KR); Do-Hyeung Kim, Daejeon (KR); Seung-Hee Oh, Daejeon (KR); Kwan-Tae Cho, Daejeon (KR); Joong-Yong Choi, Uijeongbu-si (KR); Ju-Young Kim, Tongyeong-si (KR); Byung-Gil Lee, Daejeon (KR); Jung-Chan Na, Daejeon (KR); Hyun-Sook Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/330,230

(22) Filed: Jul. 14, 2014

(65) Prior Publication Data
US 2015/0177735 A1 Jun. 25, 2015

(30) Foreign Application Priority Data

Dec. 19, 2013 (KR) .......................... 10-2013-0159036

(51) Int. Cl.
*G05D 1/02* (2006.01)

(52) U.S. Cl.
CPC .................................. *G05D 1/0208* (2013.01)

(58) Field of Classification Search
CPC ...... B63B 49/00; B63H 21/213; B63H 21/22; B63H 25/00; B63H 25/42; G05D 1/0206
USPC ........................................................ 701/21, 42
See application file for complete search history.

(56) References Cited

U.S. PATENT DOCUMENTS

| 7,398,741 | B2 * | 7/2008 | Koda | ...................... | A63H 23/04 |
| | | | | | 114/114 RE |
| 7,817,079 | B1 * | 10/2010 | Funk | ........................ | G01S 7/003 |
| | | | | | 342/41 |
| 7,836,841 | B2 * | 11/2010 | Tung | ........................ | B63B 21/30 |
| | | | | | 114/303 |
| 8,490,566 | B1 * | 7/2013 | Shivers, III | ............. | B63B 27/30 |
| | | | | | 114/230.14 |
| 8,858,277 | B2 * | 10/2014 | Daum | ..................... | B63H 25/42 |
| | | | | | 440/1 |

(Continued)

FOREIGN PATENT DOCUMENTS

| KR | 10-2010-0016909 | 2/2010 |
| KR | 10-2011-0109276 | 10/2011 |

*Primary Examiner* — James Trammell
*Assistant Examiner* — Atul Trivedi
(74) *Attorney, Agent, or Firm* — Staas & Halsey LLP (57) ABSTRACT

The present invention relates to an apparatus and method that control a vessel deviating from an anchorage using wide-range sensor-based spherical trigonometry. In the method, vessels anchored in an anchorage are monitored. The anchorage is defined as a group, and the group of the anchored vessels is managed. Leaving of a vessel, needing to deviate from the anchorage, from the group is controlled. If a vessel recognized as a vessel identical to one that left the group requests anchoring after a predetermined period of time has elapsed, the anchoring-requesting vessel is controlled.

12 Claims, 6 Drawing Sheets

(56) References Cited

U.S. PATENT DOCUMENTS

| | | | |
|---|---|---|---|
| 2003/0112171 A1* | 6/2003 | Michaelson | B63B 43/18 342/41 |
| 2007/0017426 A1* | 1/2007 | Kaji | B63J 99/00 114/114 RE |
| 2009/0115622 A1* | 5/2009 | Michie | B63B 21/22 340/686.1 |
| 2010/0186652 A1* | 7/2010 | Martin | B63B 21/00 114/230.1 |
| 2012/0299776 A1 | 11/2012 | Lee et al. | |
| 2013/0002476 A1* | 1/2013 | Laine | G01S 5/0027 342/353 |
| 2013/0058271 A1* | 3/2013 | De Latour | H04B 7/18508 370/315 |
| 2014/0111368 A1* | 4/2014 | Lee | G08G 3/02 342/41 |
| 2015/0158564 A1* | 6/2015 | Miyamoto | B63B 21/00 340/985 |

* cited by examiner

APPARATUS AND METHOD FOR CONTROLLING VESSEL DEVIATING FROM ANCHORAGE

CROSS REFERENCE TO RELATED APPLICATION

This application claims the benefit of Korean Patent Application No. 10-2013-0159036, filed on Dec. 19, 2013, which is hereby incorporated by reference in its entirety into this application.

BACKGROUND OF THE INVENTION

1. Technical Field

The present invention relates generally to an apparatus and method for controlling a vessel deviating from an anchorage and, more particularly, to an apparatus and method that control a vessel deviating from an anchorage using wide-range sensor-based spherical trigonometry.

2. Description of the Related Art

Recently, the rapid development of Information Technology (IT) has created a new synergy by combining an IT environment with various fields and developing various convergence services. Among these convergence services, a Vessel Traffic Service (VTS) has become an essential national base project for improving the efficiency of port management by guaranteeing the safety of vessel navigation, and research into VTS has been actively conducted and commercialized. However, VTS systems which are currently being developed and investigated are focused only on basic sensor components, such as radar devices, Closed Circuit Televisions (CCTVs), and Very High Frequency (VHF) sensors for monitoring the movement of vessels.

For example, Korean Patent Application Publication No. 2011-0109276 entitled "Remote support service system for vessel equipment using Very Small Aperture Terminal (VSAT)" discloses technology which improves existing insufficient information and delayed information via the transmission of information between vessels and a land control center, and then supports the safe and economic navigation of vessels.

However, since these systems are focused on basic sensor components for monitoring the movement of vessels, it is difficult to promptly cope with an accidental emergency, and research into the solution of this problem has appeared as a primary research consideration.

For example, a decision-making framework scheme is a scheme proposed by John et al., in 2005 and is configured to propose an information analysis and design scheme so as to design an efficient framework for the decision-making system of a military vessel. This scheme considers a decision-making system using Karush-Kuhn-Tucker (KKT) conditions. Further, such a scheme proposes a method of configuring a decision-making system for a military vessel by additionally applying a Multi-criteria decision making (MCDM) scheme. In order to apply MCDM, the complexity and typical requirements of Weighted Sum (WS), Hierarchical Weighted Sum (HWS), Analytical Hierarchy Process (AHP), Multi-Attribute Utility (MAU), etc. have been described.

In particular, the decision-making framework scheme has proved the efficiency thereof by analyzing and implementing entities in an area based on Survivability of Suspected Target Search at the End of Burst (STS-EB) and Survivability of Suspected Target Search at the End of Search (STS-ES). However, the decision-making framework scheme has the following vulnerabilities.

First, there is area-based vulnerability. In detail, when a decision-making system is configured based on areas, it is difficult to promptly cope with an emergency situation and an additional situation that may occur in a single area. In particular, whether the area of a detected target has deviated from a current area is monitored, and only a situation is considered, via the division of areas, and thus a separate algorithm and service for controlling various problems that may occur in each area are required.

Second, there is vulnerability related to the problem of the management of individual targets. The decision-making framework scheme is intended to implement an efficient vessel design by introducing a decision-making system which is designed via the STS-ES prediction of sea level and which uses various criteria so as to detect and recognize targets. In particular, a decision-making system having the decision-making framework scheme predicts the route of a target based on sea level and meteorological information, and thus proves association between mobility and marine meteorology. However, such a decision-making system is problematic in applicability to a special (military use) environment because external factors (meteorological conditions) rather than detailed information about a target are regarded as important upon making a single detailed decision.

A routing, ship size, and sailing frequency decision-making scheme is a scheme proposed by Chaug et al., in 2006, and is configured to propose a model for efficient shipping and ship determination so as to route containers in consideration of cargo costs and shipping costs. In order to support such a model, an optimal decision-making scheme is proposed, and efficient decision making is supported by analyzing a cost-effective scheme. However, such a routing, ship size, and sailing frequency decision-making scheme has the following vulnerabilities.

First, there is vulnerability related to applicability to the calculation of an optimal route based on the attribute information of a ship. This scheme calculates a cost-effective optimal route based on the attribute information of ships. However, in this case, contents related to meteorology information and sea level information in addition to the attribute information of ships are not considered, and only costs for maximizing cost efficiency for two entities are considered, so that various variables that may occur in an actual situation are not taken into consideration, and thus the applicability thereof comes into question.

Second, there is vulnerability related to the inefficiency of the management of a single ship. This scheme proposes a decision-making scheme in consideration of shipping cargo. However, since this scheme considers only a single ship, a separate management scheme is required so as to manage a plurality of ships due to the unified management of a large vessel or a high-speed ship.

SUMMARY OF THE INVENTION

Accordingly, the present invention has been made keeping in mind the above problems occurring in the prior art, and an object of the present invention is to provide an apparatus and method that control a vessel deviating from an anchorage using wide-range sensor-based spherical trigonometry.

In accordance with an aspect of the present invention to accomplish the above object, there is provided a method for controlling a vessel deviating from an anchorage, including monitoring vessels anchored in an anchorage; defining the anchorage as a group, and managing the group of the anchored vessels; controlling leaving of a vessel, needing to deviate from the anchorage, from the group; and if a vessel recognized as a vessel identical to one that left the group requests anchoring after a predetermined period of time has elapsed, controlling the anchoring-requesting vessel.

Preferably, monitoring the anchored vessels may be configured to monitor the anchored vessels using spherical trigonometry.

Preferably, monitoring the anchored vessels may include calculating a distance from an initial anchorage location to each vessel located in an area of the anchorage; if the vessel is moved in the anchorage, checking an altitude and a longitude of a moved location of the vessel, and extracting a travel distance based on the altitude and the longitude; comparing the travel distance with the anchorage area, and determining whether results of the comparison fall within an error range; if it is determined that the comparison results fall within the error range, determining whether anchor dragging of a corresponding target vessel that is the moved vessel occurs; if it is determined that anchor dragging occurs, calculating a minimum turning radius of the target vessel caused by anchoring; and checking distances from neighboring targets using the minimum turning radius, and if the distances fall outside the minimum turning radius, transferring a warning message to the corresponding target vessel.

Preferably, transferring may be configured to transfer the warning message to the corresponding target vessel via Very High Frequency (VHF) communication.

Preferably, managing the group may include when a new anchoring-requesting vessel desires to join the group, performs an authentication procedure via exchange of preliminary information, and allowing the anchoring-requesting vessel to join the group as a new group member; determining whether the anchoring-requesting vessel that joined the group as the new group member corresponds to a previously registered vessel; if the anchoring-requesting vessel does not correspond to a previously registered vessel, generating a group key pair corresponding to the anchoring-requesting vessel; and encrypting the group key pair using a session key, and transferring the encrypted group key pair and the session key to the anchoring-requesting vessel.

Preferably, controlling the leaving of the vessel from the group may be configured to control the leaving of the vessel from the group by verifying Maritime Mobile Service Identity (MMSI) of the vessel needing to deviate from the anchorage.

Preferably, controlling the anchoring-requesting vessel may include if the vessel recognized as the vessel identical to one that left the group requests anchoring, transferring a current session key and an anchoring request time to the anchoring-requesting vessel, using a public key/private key pair of the anchoring-requesting vessel; and verifying results of decrypting the current session key using the private key in the anchoring-requesting vessel, and updating the session key based on results of verification.

In accordance with another aspect of the present invention to accomplish the above object, there is provided an apparatus for controlling a vessel deviating from an anchorage, including a monitoring unit for monitoring vessels anchored in an anchorage; a group management unit for defining the anchorage as a group, and managing the group of the anchored vessels; a leave-group control unit for controlling leaving of a vessel, needing to deviate from the anchorage, from the group; and an anchoring control unit for, if a vessel recognized as a vessel identical to one that left the group requests anchoring after a predetermined period of time has elapsed, controlling the anchoring-requesting vessel.

Preferably, the monitoring unit may monitor the anchored vessels using spherical trigonometry.

Preferably, the monitoring unit may be configured to, if a vessel is moved in the anchorage, extract a travel distance using an altitude and a longitude of a moved location of the vessel, and if results of a comparison between the travel distance and an area of the anchorage fall within an error range, determine whether anchor dragging of a corresponding target vessel that is the moved vessel occurs.

Preferably, if it is determined that anchor dragging occurs, a minimum turning radius of the target vessel caused by anchoring may be calculated, and distances from neighboring targets may be checked using the minimum turning radius, and if the distances fall outside the minimum turning radius, a warning message may be transferred to the corresponding target vessel.

Preferably, when the warning message is transferred to the corresponding target vessel, Very High Frequency (VHF) communication may be used.

Preferably, the group management unit may be configured to, when a new anchoring-requesting vessel desires to join the group, perform an authentication procedure via exchange of preliminary information, and allow the anchoring-requesting vessel to join the group as a new group member, and is configured to, if the anchoring-requesting vessel that joined the group as the new group member does not correspond to a previously registered vessel, generate a group key pair corresponding to the anchoring-requesting vessel.

Preferably, the leave-group control unit may be configured to control the leaving of the vessel from the group by verifying Maritime Mobile Service Identity (MMSI) of the vessel needing to deviate from the anchorage.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, an apparatus and method for controlling a vessel deviating from an anchorage according to embodiments of the present invention will be described in detail with reference to the attached drawings. Here, the term "anchorage" denotes a place where a buoy is present so that a vessel can be safely anchored.

An apparatus for controlling a vessel deviating from an anchorage according to an embodiment of the present invention may be located in a control center, but is not limited thereto.

A controller having authority to control the center, that is, the apparatus for controlling a vessel deviating from an anchorage, previously sets an error range R required to determine whether anchor dragging has occurred. Further, the controller previously sets a deviation error range B for the anchorage.

The location of a vessel is implemented as a pair of positive real numbers corresponding to "(latitude, longitude)" of a place where the vessel is currently located.

An anchorage ground g denotes the anchorage of a vessel, and is implemented as a form similar to that of the location of the vessel, that is, a pair of positive real numbers corresponding to "(latitude, longitude)". Further, a set of such anchorage groups is defined as 'G.'

Group members corresponding to respective targets in the anchorage are defined as static configuration entities which are not free of joining and leaving a group.

The apparatus for controlling a vessel deviating from an anchorage previously receives basic details and other details, via VHF communication with vessels which request anchoring in the corresponding anchorage.

The apparatus for controlling a vessel deviating from an anchorage arranges information for anchoring and unique information about each vessel into a separate database (DB) and stores the information in the DB.

The apparatus for controlling a vessel deviating from an anchorage stores information about a session key, a public key/private key pair generated during a communication procedure in anchoring, and times at which the vessel enters and leaves the anchorage.

Figure 1:
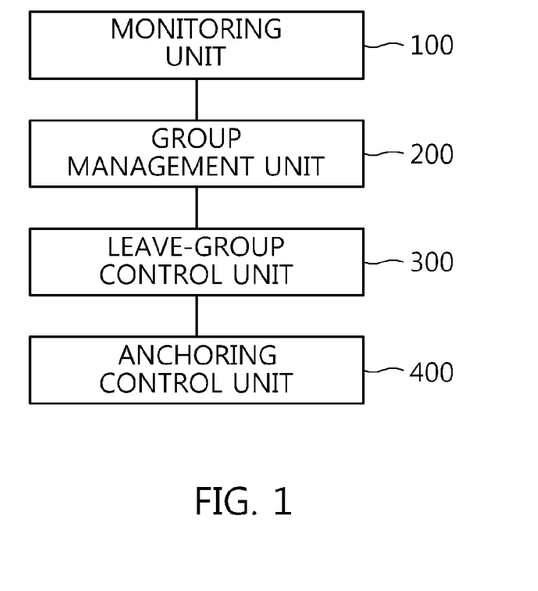
FIG. 1 is a configuration diagram schematically showing an apparatus for controlling a vessel deviating from an anchorage according to an embodiment of the present invention.

FIG. 1 is a configuration diagram schematically showing an apparatus for controlling a vessel deviating from an anchorage (hereinafter also referred to as an "anchorage-deviating vessel control apparatus") according to an embodiment of the present invention.

Referring to FIG. 1, the anchorage-deviating vessel control apparatus includes a monitoring unit 100, a group management unit 200, a leave-group control unit 300, and an anchoring control unit 400.

The monitoring unit 100 monitors vessels anchored in the anchorage, that is, anchored vessels, using spherical trigonometry.

In detail, the monitoring unit 100 is configured to monitor whether each anchored vessel deviates from an anchorage for entrance into a port when the vessel is anchored in the anchorage, or monitor whether each anchored vessel deviates from the anchorage due to a special situation.

The group management unit 200 defines the anchorage as a group and manages the group of anchored vessels.

The leave-group control unit 300 controls the leaving of a vessel, which needs to deviate from the anchorage, from the corresponding group.

The anchoring control unit 400 is configured to, when a vessel recognized as a vessel identical to the one that left the group requests anchoring after a predetermined period of time has elapsed, control the anchoring of the vessel.

Below, a method of controlling a vessel deviating from an anchorage by using the anchorage-deviating vessel control apparatus shown in FIG. 1 will be described in detail with reference to FIG. 2.

Figure 2:
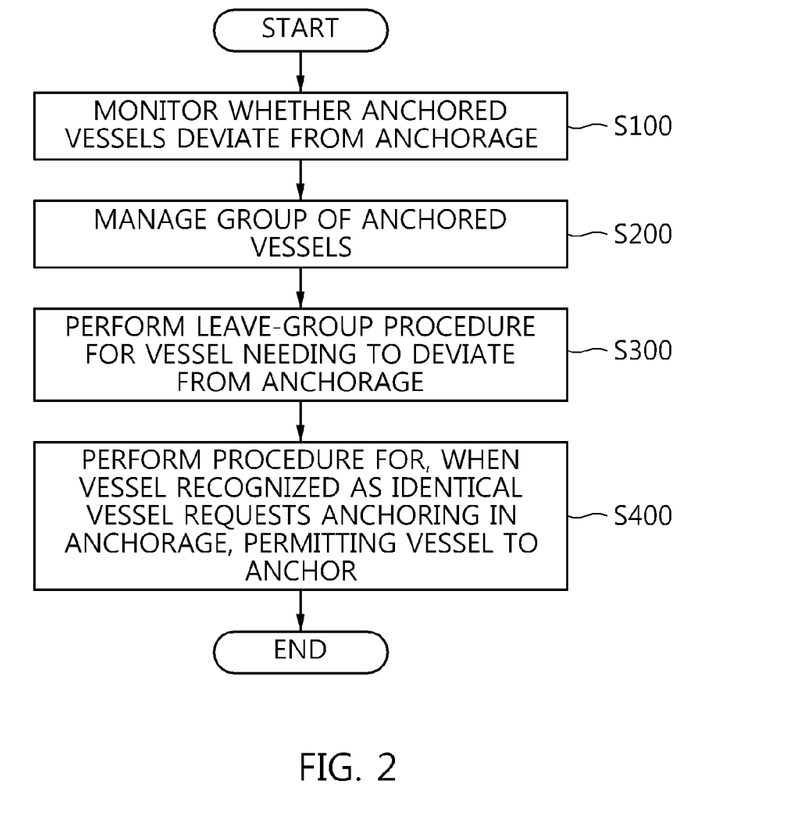
FIG. 2 is a flowchart showing a method of controlling a vessel deviating from an anchorage according to an embodiment of the present invention.

FIG. 2 is a flowchart showing the method of controlling a vessel deviating from an anchorage according to an embodiment of the present invention.

Referring to FIG. 2, the anchorage-deviating vessel control apparatus monitors vessels anchored in an anchorage using spherical trigonometry at step S100.

The anchorage-deviating vessel control apparatus defines the anchorage as a group, and manages the group of anchored vessels at step S200.

The anchorage-deviating vessel control apparatus performs a leave-group procedure for receiving a deviation request from a vessel, which needs to deviate from the corresponding anchorage, verifying maritime mobile service identity (hereinafter referred to as "MMSI") corresponding to the request, and permitting the vessel to deviate from the anchorage if MMSI has been correctly verified at step S300.

The anchorage-deviating vessel control apparatus performs a procedure for, when a vessel recognized as a vessel identical to the one that left the group requests anchoring, permitting the anchoring of the vessel at step S400.

Then, the step S100 of monitoring the vessels anchored in the anchorage will be described in detail with reference to FIG. 3.

Figure 3:
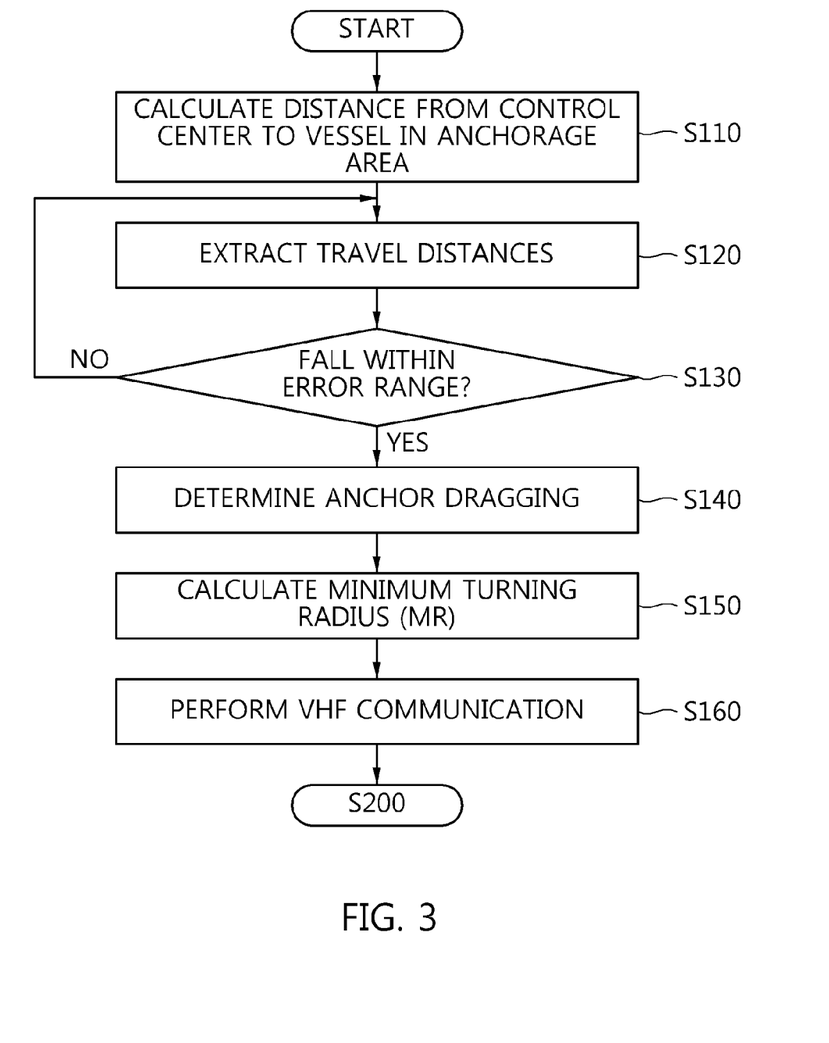
FIG. 3 is a flowchart showing a method of monitoring a vessel anchored in the anchorage according to an embodiment of the present invention.

FIG. 3 is a flowchart showing a method of monitoring a vessel anchored in the anchorage according to an embodiment of the present invention.

Referring to FIG. 3, the anchorage-deviating vessel control apparatus calculates a distance from control center A (=the location of an initial anchorage) to a vessel in an anchorage area at step S110.

When the vessel is moving in the anchorage in a special situation such as bad weather conditions, the anchorage-deviating vessel control apparatus checks the latitude and longitude of a current location, to which the vessel is moved, when the vessel deviates from the initial anchored location based on the control center A, and extracts a travel distance along a great circle and a travel distance along a parallel small circle at the same longitude using spherical trigonometry at step S120.

The anchorage-deviating vessel control apparatus compares the travel distances extracted at steps S120 with the anchorage area, and determines whether the results of the comparison fall within any error range at step S130.

If the comparison results fall within the error range, the anchorage-deviating vessel control apparatus determines whether the anchor of the corresponding target vessel (the moved vessel) is dragging, that is, whether anchor dragging occurs, at step S140. In this case, the anchorage-deviating vessel control apparatus determines anchor dragging via the following Equation (1):

$$\begin{cases} \text{if} & B > BR, \quad B > SR \text{ then } T = 1 \\ \text{else} & B \leq BR, \quad B \leq SR \text{ then } T = 0 \end{cases} \quad (1)$$

Referring to Equation (1), B denotes the moving location of the anchored vessel, and BR and SR respectively denote a great circle and a small circle of spherical trigonometry around the control center A depending on the location of the vessel moved from the initial anchorage. Further, T denotes anchor dragging.

If anchor dragging occurs (T=1) at step S140, the anchorage-deviating vessel control apparatus calculates the minimum turning radius (MR) of the target vessel caused by anchoring at step S150. Here, the minimum turning radius (MR) is represented by the following Equation (2):

$$MR = \left( \frac{L}{\sin\alpha} + r \right) \times s \quad (2)$$

Referring to Equation (2), $\alpha$ denotes the rotation angle of the rotating vessel, and L denotes the length of the vessel. Further, r denotes the absolute value of a distance between the length of the anchor and the center of the steering handle, and s denotes the movement speed of the anchored vessel per minute.

The anchorage-deviating vessel control apparatus checks distances from neighboring targets using the minimum turning radius calculated at step S150, provides a warning message to the corresponding target vessel via VHF communication to notify the target vessel of a current deviation state and actions to be taken if the distances fall outside the minimum turning radius, at step S160.

Then, the step S200 of managing the group of anchored vessels will be described in detail below with reference to FIG. 4.

Figure 4:
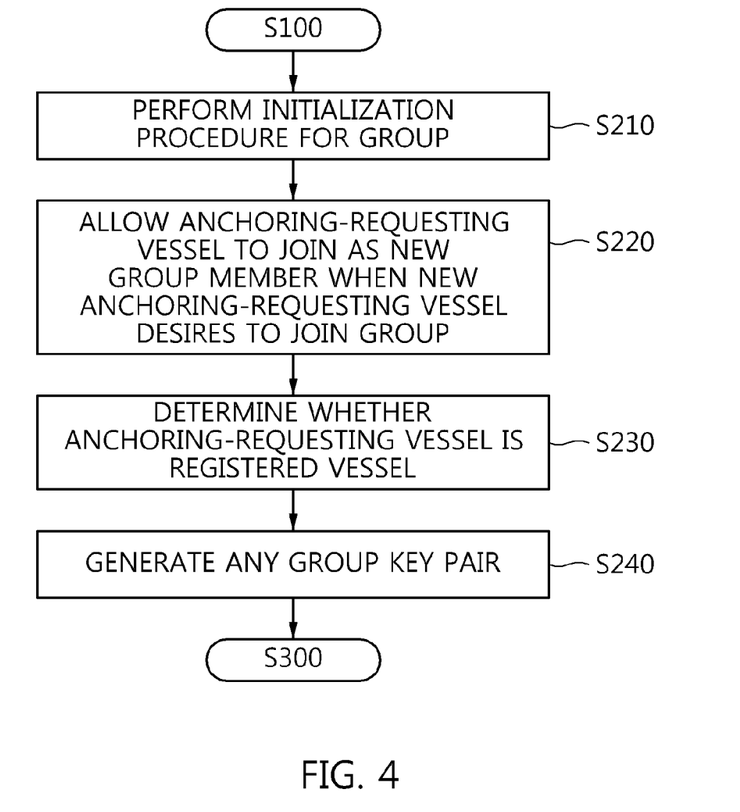
FIG. 4 is a flowchart showing a method of managing groups of anchored vessels according to an embodiment of the present invention.

FIG. 4 is a flowchart showing a method of managing the group of anchored vessels according to an embodiment of the present invention.

First, the anchorage-deviating vessel control apparatus defines a single anchorage as a single group and performs the following procedure on anchored vessels in order to apply a multi-group environment to vessels temporarily anchored in the anchorage and efficiently manage targets for the corresponding anchorage.

Referring to FIG. 4, the anchorage-deviating vessel control apparatus performs an initialization procedure on the group using unique IDs received from respective targets at step S210. Here, the unique IDs are generated using a procedure given in the following Equation (3):

(anchoring/port entry information $\oplus$MMSI)=$AID_1$ $H(AID_1)=ID_1$ $I=(ID_1\|ID_2\|\ldots\|ID_n) \quad (3)$ The anchorage-deviating vessel control apparatus is configured to, when a new anchoring-requesting vessel desires to join the group, perform an authentication procedure via the exchange of preliminary information, and then allow the vessel to join the group as a new group member at step S220. In this case, the anchorage-deviating vessel control apparatus updates the I value of the corresponding group, and stores the I value.

The anchorage-deviating vessel control apparatus determines whether the anchoring-requesting vessel which joined the group as the new group member corresponds to a previously registered vessel at step S230.

If the anchoring-requesting vessel does not correspond to a previously registered vessel, the anchorage-deviating vessel control apparatus generates an arbitrary group key pair via the following specific procedure for the anchoring-requesting vessel at step S240.

In detail, if it is determined at step S230 that the anchoring-requesting vessel does not correspond to the previously registered vessel, the anchorage-deviating vessel control apparatus represents the ID of the anchoring-requesting vessel by the following Equation (4):

$I'=(ID_2\|ID_3\|\ldots\|ID_n)$ $ID'_1=(H(I)-H(I')) \quad (4)$ where H( ) denotes a hash algorithm.

Then, the anchorage-deviating vessel control apparatus generates a pseudo-random number $\alpha_s$ corresponding to the anchoring-requesting vessel, and calculates $w_s$ using the pseudo-random number, where $w_s$ is represented by the following Equation (5):

$w_s = \alpha_s^{ID_1^{-1}} \bmod n \quad (5)$

The anchorage-deviating vessel control apparatus transfers the calculated $w_s$ and the pseudo-random number $\alpha_s$ to the anchoring-requesting vessel.

Then, the anchoring-requesting vessel receives the calculated $w_s$ and the pseudo-random number $\alpha_s$, calculates $w_s'$, compares $w_s$ with $w_s'$, and then verifies the validity of the received information. Thereafter, $w_s$ and $w_s'$ are represented by the following Equation (6):

$w_s' = \alpha_s^{ID_1^{-1}} \bmod n$ $w_s = w_s' \quad (6)$

If the received information is valid, the anchoring-requesting vessel generates information such as that in the following Equation (7), and transfers the generated information to the anchorage-deviating vessel control apparatus.

$y_1 = ID_1 \times r_1$ $B_1 = w_s^{r_1} \bmod n \quad (7)$

In Equation 7, $r_1$ denotes the pseudo-random number generated by the anchoring-requesting vessel.

The anchorage-deviating vessel control apparatus generates a pair of random i group keys $(P_1, Q_1)$ using the information given in Equation (7), encrypts the generated group key pair using a session key C, and transfers the encrypted group key pair and the session key to the anchoring-requesting vessel. Here, the session key is represented by the following Equation (8):

$C = \alpha_s^{\eta \times AID_1} \bmod n \quad (8)$

Below, step S300 corresponding to a procedure for allowing a vessel, which needs to deviate from the anchorage, to leave a group will be described in detail with reference to FIG. 5.

Figure 5:
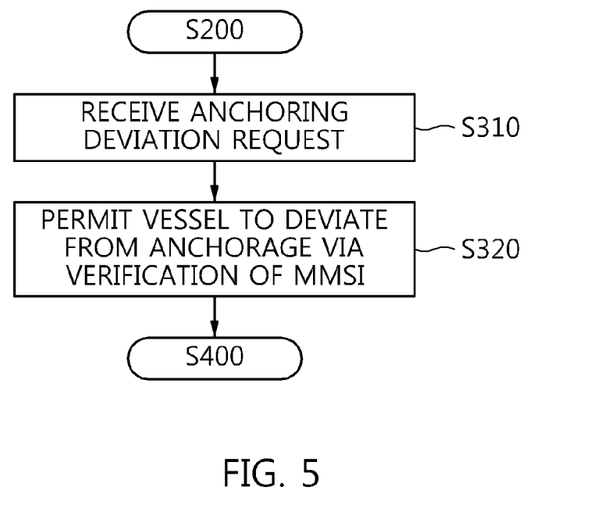
FIG. 5 is a flowchart showing a procedure for allowing a vessel, which needs to deviate from the anchorage, to leave a group according to an embodiment of the present invention.

FIG. 5 is a flowchart showing a procedure for allowing a vessel, which needs to deviate from the anchorage, to leave a group according to an embodiment of the present invention.

First, the vessel which needs to deviate from the anchorage requests the anchorage-deviating vessel control apparatus to deviate from the anchorage, and leaves the corresponding anchorage group using the following procedure.

Referring to FIG. 5, the anchorage-deviating vessel control apparatus receives an anchorage deviation request from the vessel needing to deviate from the anchorage at step S310. In this case, the vessel needing to deviate from the anchorage also transfers V and t together with the anchorage deviation request, where V is represented by the following Equation (9), and t denotes a timestamp:

$$V = E_c(H(\text{anchoring/port entry information} \oplus AID_1)) \quad (9)$$

In Equation 9, E( ) and H( ) denote an encryption algorithm and a hash algorithm, respectively.

The anchorage-deviating vessel control apparatus verifies the MMSI of the corresponding vessel by performing an Exclusive OR (XOR) operation on V and t which are received together with the anchorage deviation request, and permits the vessel to deviate from the anchorage if the MMSI has been correctly verified at step S320.

Below, the step S400 corresponding to a procedure for, when a vessel recognized as a vessel identical to the one that left the group requests anchoring, permitting the anchoring of the vessel will be described in detail with reference to FIG. 6.

Figure 6:
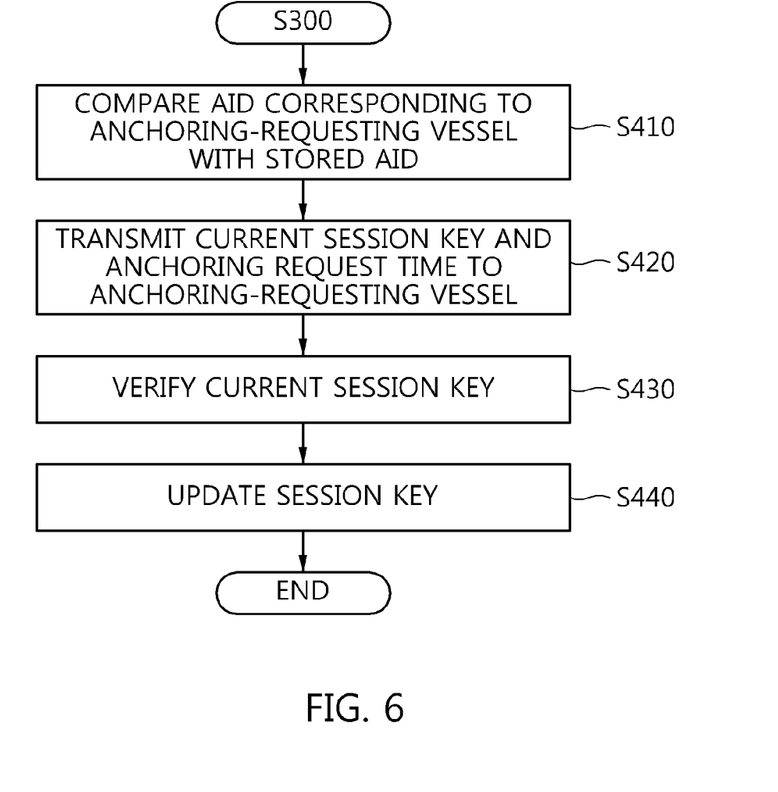
FIG. 6 is a flowchart showing a procedure for, when a vessel recognized as an identical vessel requests anchoring in the anchorage, permitting anchoring according to an embodiment of the present invention.

FIG. 6 is a flowchart showing a procedure for, when a vessel recognized as a vessel identical to the one that left the group requests anchoring, permitting anchoring according to an embodiment of the present invention.

Referring to FIG. 6, the anchorage-deviating vessel control apparatus receives an AID corresponding to the anchoring-requesting vessel (see Equation (3) at step S200), and compares the received AID with an AID stored in a previous anchoring procedure at step S410.

The anchorage-deviating vessel control apparatus is configured to, if, as a result of the comparison with the AID stored in the previous anchoring procedure at step S410, the AID corresponding to the anchoring-requesting vessel is identical to the stored AID, a current session key and an anchoring request time are calculated based on a previously allocated public key/private key pair, and are transmitted to the anchoring-requesting vessel at step S420. In this case, the current session key $C_i$ and the anchoring request time t are calculated by the following Equation (10):

$$C_i = (C_{i-1} \oplus |\Delta t_i - t_{i-1}|)$$

$$V_i = E_{P_i}(C_i \| t_i) \quad (10)$$

Then, the anchoring-requesting vessel decrypts the current session key received from the anchorage-deviating vessel control apparatus using a private key $Q_i$ received in a previous anchoring communication procedure, and verifies the decrypted current session key at step S430. Further, if the decrypted current session key corresponds to a correct key as a result of the verification at step S430, the anchoring-requesting vessel updates the current session key to a reference session key at step S440.

In accordance with the present invention, the apparatus and method for controlling a vessel deviating from an anchorage may manage and monitor the vessel deviating from the anchorage using spherical trigonometry based on information collected by wide-range sensors, thus actively and positively managing vessels.

Therefore, the present invention is advantageous in that an emergency management system for a maritime transportation service is constructed in a convergence service environment, thus promptly managing and coping with emergency in an improved form.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A method for controlling a vessel deviating from an anchorage, comprising:
   monitoring vessels anchored in an anchorage;
   defining the anchorage as a group, and managing the group of the anchored vessels;
   controlling leaving of a vessel, needing to deviate from the anchorage, from the group; and
   if a vessel recognized as a vessel identical to one that left the group requests anchoring after a predetermined period of time has elapsed, controlling the anchoring-requesting vessel,
   wherein managing the group comprises:
   when a new anchoring-requesting vessel desires to loin the group, performs an authentication procedure via exchange of preliminary information, and allowing the anchoring-requesting vessel to loin the group as a new group member;
   determining whether the anchoring-requesting vessel that joined the group as the new group member corresponds to a previously registered vessel;
   if the anchoring-requesting vessel does not correspond to a previously registered vessel, generating a group key pair corresponding to the anchoring-requesting vessel; and
   encrypting the group key pair using a session key, and transferring the encrypted group key pair and the session key to the anchoring-requesting vessel.

2. The method of claim 1, wherein monitoring the anchored vessels is configured to monitor the anchored vessels using spherical trigonometry.

3. The method of claim 1, wherein monitoring the anchored vessels comprises:
   calculating a distance from an initial anchorage location to each vessel located in an area of the anchorage;
   if the vessel is moved in the anchorage, checking a latitude and a longitude of a moved location of the vessel, and extracting a travel distance based on the latitude and the longitude;
   comparing the travel distance with the anchorage area, and determining whether results of the comparison fall within an error range;
   if it is determined that the comparison results fall within the error range, determining whether anchor dragging of a corresponding target vessel that is the moved vessel occurs;
   if it is determined that anchor dragging occurs, calculating a minimum turning radius of the target vessel caused by anchoring; and
   checking distances from neighboring targets using the minimum turning radius, and if the distances fall outside the minimum turning radius, transferring a warning message to the corresponding target vessel.

4. The method of claim 3, wherein transferring is configured to transfer the warning message to the corresponding target vessel via Very High Frequency (VHF) communication.

5. The method of claim 1, wherein controlling the anchoring-requesting vessel comprises:
   if the vessel recognized as the vessel identical to one that left the group requests anchoring, transferring a current session key and an anchoring request time to the anchoring-requesting vessel, using a public key/private key pair of the anchoring-requesting vessel; and verifying results of decrypting the current session key using the private key in the anchoring-requesting vessel, and updating the session key based on results of verification.

6. The method of claim 1, wherein controlling the leaving of the vessel from the group is configured to control the leaving of the vessel from the group by verifying Maritime Mobile Service Identity (MMSI) of the vessel needing to deviate from the anchorage.

7. An apparatus for controlling a vessel deviating from an anchorage, comprising:
a monitoring unit for monitoring vessels anchored in an anchorage;
a group management unit for defining the anchorage as a group, and managing the group of the anchored vessels;
a leave-group control unit for controlling leaving of a vessel, needing to deviate from the anchorage, from the group; and
an anchoring control unit for, if a vessel recognized as a vessel identical to one that left the group requests anchoring after a predetermined period of time has elapsed, controlling the anchoring-requesting vessel, wherein
the group management unit is configured to, when a new anchoring-requesting vessel desires to join the group, perform an authentication procedure via exchange of preliminary information, and allow the anchoring-requesting vessel to loin the group as a new group member, and is configured to, if the anchoring-requesting vessel that joined the group as the new group member does not correspond to a previously registered vessel, generate a group key pair corresponding to the anchoring-requesting vessel.

8. The apparatus of claim 7, wherein the monitoring unit monitors the anchored vessels using spherical trigonometry.

9. The apparatus of claim 7, wherein the monitoring unit is configured to, if a vessel is moved in the anchorage, extract a travel distance using a latitude and a longitude of a moved location of the vessel, and if results of a comparison between the travel distance and an area of the anchorage fall within an error range, determine whether anchor dragging of a corresponding target vessel that is the moved vessel occurs.

10. The apparatus of claim 9, wherein if it is determined that anchor dragging occurs, a minimum turning radius of the target vessel caused by anchoring is calculated, and distances from neighboring targets are checked using the minimum turning radius, and if the distances fall outside the minimum turning radius, a warning message is transferred to the corresponding target vessel.

11. The apparatus of claim 10, wherein when the warning message is transferred to the corresponding target vessel, Very High Frequency (VHF) communication is used.

12. The apparatus of claim 7, wherein the leave-group control unit is configured to control the leaving of the vessel from the group by verifying Maritime Mobile Service Identity (MMSI) of the vessel needing to deviate from the anchorage.

* * * * *